United States Patent
Mujkic et al.

(10) Patent No.: US 9,290,719 B2
(45) Date of Patent: Mar. 22, 2016

(54) RENEWABLE FATTY ACID WAXES AND METHODS OF MAKING

(71) Applicant: ELEVANCE RENEWABLE SCIENCES, INC., Woodridge, IL (US)

(72) Inventors: Monika Mujkic, Central, SC (US); Michael Tupy, Crystal, MN (US); Stephen E. Russell, Grayslake, IL (US); Scott Walters, Sugar Grove, IL (US); Benjamin Bergmann, Anderson, SC (US); Michelle Morie-Bebel, Naperville, IL (US); Steven A. Cohen, Naperville, IL (US); Syed Q. A. Rizvi, Painesville, OH (US); Stephen A. DiBiase, Willowbrook, IL (US); Garrett Zopp, Crystal Lake, IL (US)

(73) Assignee: Elevance Renewable Sciences, Inc., Woodridge, IL (US)

( * ) Notice: Subject to any disclaimer, the term of this patent is extended or adjusted under 35 U.S.C. 154(b) by 352 days.

(21) Appl. No.: 13/728,560

(22) Filed: Dec. 27, 2012

(65) Prior Publication Data

US 2013/0178640 A1 Jul. 11, 2013

Related U.S. Application Data

(60) Provisional application No. 61/580,822, filed on Jan. 10, 2012.

(51) Int. Cl.
*C07C 51/36* (2006.01)
*C11C 1/02* (2006.01)
*C11C 3/12* (2006.01)

(52) U.S. Cl.
CPC . *C11C 1/025* (2013.01); *C11C 3/12* (2013.01); *C11C 3/123* (2013.01)

(58) Field of Classification Search
USPC .......................................... 554/141
See application file for complete search history.

(56) References Cited

U.S. PATENT DOCUMENTS 2,619,422 A 11/1952 Diamond
3,448,178 A 6/1969 Flanagan
(Continued)

FOREIGN PATENT DOCUMENTS

EP 0429995 A2 6/1991
EP 1408064 A1 4/2004
(Continued)

OTHER PUBLICATIONS

Anderson et al., "Synthesis and Reactivity of Olefin Metathesis Catalysts Bearing Cyclic (Alkyl)(Amino) Carbenes," Angewandte Chemie International Edition, vol. 46, 2007, pp. 7262-7265.
Baumann et al., "Natural Fats and Oils—Renewable Raw Materials for the Chemical Industry," Angewandte Chemie International Edition in English, vol. 27, 1988, pp. 41-62.
Biermann et al., "New Syntheses with Oils and Fats as Renewable Raw Materials for the Chemical Industry,", Angewandte Chemie International Edition, vol. 39, 2000, pp. 2206-2224.
(Continued)

Primary Examiner — Deborah D Carr
(74) Attorney, Agent, or Firm — Robert S. Dailey (57) ABSTRACT

Natural oil based fatty acid wax compositions and their methods of making are provided. The methods comprise providing a natural oil, and hydrogenating and metathesizing the natural oil, and then converting the hydrogenated metathesized natural oil to obtain a fatty acid wax comprising free fatty acids and/or salts of fatty acids, glycerol and/or alcohol, and paraffin, wherein the fatty acid wax has at least 50 wt % of carbon chain compositions with at least 18 carbon atoms. The compositions may comprise 85-100 wt % long-chain fatty acids, 0-15 wt % esters, wherein the fatty acid comprises between 15-60 wt % long chain di-acids and 40-85 wt % long chain mono-acids. The compositions may comprise about 50-100 wt % long-chain fatty acids and about 0-50 wt % esters, wherein the fatty acid may comprise between about 15-80 wt % long chain di-acids and about 20-85 wt % long chain monoacids.

9 Claims, 1 Drawing Sheet

(56) References Cited

U.S. PATENT DOCUMENTS

| | | | |
|---|---|---|---|
| 3,896,053 A | 7/1975 | Broecker et al. | |
| 3,983,147 A | 9/1976 | Senda et al. | |
| 5,142,072 A | 8/1992 | Stipp et al. | |
| 5,506,363 A | 4/1996 | Grate et al. | |
| 5,700,516 A | 12/1997 | Sandvick et al. | |
| 5,734,070 A | 3/1998 | Tacke et al. | |
| 6,197,894 B1 | 3/2001 | Sunaga et al. | |
| 6,211,315 B1 | 4/2001 | Larock et al. | |
| 6,486,264 B1 | 11/2002 | Tsunogae et al. | |
| 6,696,597 B2 | 2/2004 | Pedersen et al. | |
| 6,900,347 B2 | 5/2005 | Paulson et al. | |
| 6,962,729 B2 | 11/2005 | Tokas et al. | |
| 6,987,154 B2 | 1/2006 | Choi et al. | |
| 7,026,495 B1 | 4/2006 | Pedersen et al. | |
| 7,119,216 B2 | 10/2006 | Newman et al. | |
| 7,176,336 B2 | 2/2007 | Maughon et al. | |
| 7,314,904 B2 | 1/2008 | Nadolsky et al. | |
| 7,365,140 B2 | 4/2008 | Piers et al. | |
| 7,576,227 B2 | 8/2009 | Lysenko | |
| 7,585,990 B2 | 9/2009 | Toor et al. | |
| 7,678,932 B2 | 3/2010 | Thurier et al. | |
| 7,812,185 B2 | 10/2010 | Burdett et al. | |
| 2002/0095007 A1 | 7/2002 | Larock et al. | |
| 2005/0027136 A1 | 2/2005 | Toor et al. | |
| 2005/0070750 A1 | 3/2005 | Newman et al. | |
| 2005/0203324 A1 | 9/2005 | Lee et al. | |
| 2006/0079704 A1 | 4/2006 | Lacombe et al. | |
| 2006/0289138 A1 | 12/2006 | Borsinger et al. | |
| 2007/0068642 A1* | 3/2007 | Borsinger et al. | 162/172 |
| 2007/0179307 A1 | 8/2007 | Olivier-Bourbigou et al. | |
| 2007/0270621 A1 | 11/2007 | Millis et al. | |
| 2008/0027194 A1 | 1/2008 | Schrodi | |
| 2008/0064891 A1 | 3/2008 | Lee | |
| 2009/0048459 A1 | 2/2009 | Tupy et al. | |
| 2009/0126602 A1 | 5/2009 | Murphy et al. | |
| 2009/0217568 A1* | 9/2009 | Murphy et al. | 44/275 |
| 2009/0220443 A1 | 9/2009 | Braksmayer et al. | |
| 2009/0259065 A1 | 10/2009 | Abraham et al. | |
| 2009/0264672 A1 | 10/2009 | Abraham et al. | |
| 2010/0047499 A1 | 2/2010 | Braksmayer et al. | |
| 2010/0094034 A1 | 4/2010 | Kaido et al. | |
| 2010/0145086 A1 | 6/2010 | Schrodi et al. | |

FOREIGN PATENT DOCUMENTS

| | | | |
|---|---|---|---|
| EP | 1810960 A1 | 7/2007 | |
| FR | 2878246 A1 | 5/2006 | |
| JP | 56-077243 A | 6/1981 | |
| JP | 09-014574 A | 1/1997 | |
| SU | 1565872 A1 | 7/1988 | |
| WO | WO 94/23836 A1 | 10/1994 | |
| WO | WO 96/04289 A1 | 2/1996 | |
| WO | WO 01/36368 A2 | 5/2001 | |
| WO | WO 03/057983 A1 | 7/2003 | |
| WO | WO 03/093215 A1 | 11/2003 | |
| WO | WO 03/104348 A1 | 12/2003 | |
| WO | WO 2004/033388 A1 | 4/2004 | |
| WO | WO 2004/062763 A2 | 7/2004 | |
| WO | WO 2005/080455 A1 | 9/2005 | |
| WO | WO 2006/052688 A2 | 5/2006 | |
| WO | WO 2007/081987 A2 | 7/2007 | |
| WO | WO 2007/103398 A1 | 9/2007 | |
| WO | WO 2007/103460 A2 | 9/2007 | |
| WO | WO 2008/008420 A1 | 1/2008 | |
| WO | WO 2008/010961 A2 | 1/2008 | |
| WO | WO 2008/048520 A2 | 4/2008 | |
| WO | WO 2008/063322 A2 | 5/2008 | |
| WO | WO 2008/140468 A2 | 11/2008 | |

OTHER PUBLICATIONS

Boelhouwer et al., "Metathesis Reactions of Fatty Acid Esters," Progress of Lipid Research, Pergamon Press, vol. 24, No. 3, 1985, pp. 243-267.

Chatterjee et al., "Synthesis of Trisubstituted Alkenes via Olefin Cross-Metathesis," Organic Letters, vol. 1, No. 11, 1999, pp. 1751-1753.

Choi et al., "Olefin Metathesis Involving Ruthenium Enoic Carbene Complexes," Journal of the American Chemical Society, vol. 123, No. 42, 2001, pp. 10417-10418.

Connon et al., "A Solid-Supported Phosphine-Free Ruthenium Alkylidene for Olefin Metathesis in Methanol and Water," Bioorganic & Medical Chem Letters, vol. 12, No. 14, 2002, pp. 1873-1876.

Delaude et al., Metathesis, Kirk-Othmer Encyclopedia of Chemical Technology, Dec. 2005, vol. 26, pp. 920-958.

Dunne et al., "A Highly Efficient Olefin Metathesis Initiator: Improved Synthesis and Reactivity Studies," Tetrahedron Letters, vol. 44, No. 13, 2003, pp. 2733-2736.

Erhan et al., "Drying Properties of Metathesized Soybean Oil," Journal of American Oil Chemists' Society, AOCS Press, vol. 74, No. 6, 1997, pp. 703-706.

Lavallo, "Stable Cyclic (Alkyl)(Amino) Carbenes as Rigid or Flexible, Bulky, Electron-Rich Ligands for Transition-Metal Catalysts: A Quaternary Carbon Atom Makes the Difference," Angewandte Chemie Int. Ed., vol. 44, 2005, pp. 5705-5709.

Maynard et al., "Purification Technique for the Removal of Ruthenium from Olefin Metathesis Reaction Products," Tetrahedron Letters, vol. 40, No. 22, 1999, pp. 4137-4140.

Mol, "Applications of Olefin Metathesis in Oleochemistry: An Example of Green Chemistry," Green Chemistry, Royal Society of Chemistry, Cambridge, GB, vol. 4, 2002, pp. 5-13.

Mol et al., "Metathesis in Oleochemistry," J Braz Chem Soc, vol. 9, No. 1, 1998, pp. 1-11.

Mol, "Catalytic Metathesis of Unsaturated Fatty Acid Esters and Oils," Topics in Catalysis, vol. 27, No. 1-4, 2004, pp. 97-104.

Ngo et al., Methathesis of Unsaturated Fatty Acids: Synthesis of Long-Chain Unsaturated-[alpha],[omega]-Dicarboxylic Acids, Journal of the American Oil Chemists, Jul. 2006, vol. 83m Issue 7, p. 629, 9 pgs.

Patel, Jim et al., "Cross-metathesis of unsaturated natural oils with 2-butene, High conversion and productive catalyst turnovers," Chem. Commun., 2005, pp. 5546-5547.

Patel et al., "High conversion and productive catalyst turnovers in cross-metathesis reactions of natural oils with 2-butene", Green Chemistry, 2006, vol. 8, pp. 450-454.

Refvik et al., "Ruthenium-Catalyzed Metathesis of Vegetable Oils," Journal of American Oil Chemists' Society, AOCS Press, vol. 76, No. 1, 1999, pp. 93-98.

Refvik, M.D. et al., "The Chemistry of Metathesized Soybean Oil," JAOCS, vol. 76, No. 1, 1999, pp. 99-102.

Schneider et al., "Synthesis of Highly Substituted Cyclopentane and Tetrahydrofuran Derivatives by Crossed Olefin Metathesis," Angewandte Chemi International Edition, vol. 35, No. 4, 1996, pp. 411-412.

Tian et al., "Model Studies and the ADMET Polymerization of Soybean Oil," Journal of American Oil Chemists' Society, AOCS Press, vol. 79, No. 5, 2002, pp. 479-488.

Warwel, Siegfried et al., "Synthesis of Dicarboxylic Acids by Transition-Metal Catalyzed Oxidative Cleavage of Terminal-Unsaturated Fatty Acids," Topics in Current Chemistry, vol. 164, 1993, 20 pages.

International Search Report and Written Opinion of the International Searching Authority issued in PCT Patent Application No. PCT/US2012/071802, mailed Oct. 7, 2014, 7 pages.

* cited by examiner

RENEWABLE FATTY ACID WAXES AND METHODS OF MAKING

CROSS REFERENCE TO RELATED APPLICATIONS

This application claims the benefit of U.S. Provisional Patent Application No. 61/580,822, which is incorporated herein by reference.

BACKGROUND

Montan wax, also known as lignite wax, LP wax and/or S wax, is a hard wax obtained by solvent extraction of lignite or brown coal (sub-bituminous coal). As it has been preserved in the coal, it is really fossilized plant wax. The earliest production on a commercial scale was in Germany during the latter half of the nineteenth century, and Germany continues to supply the majority of the world's production of montan wax. The composition of montan wax depends on the material from which it is extracted, but all contain varying amounts of wax, resin, and asphalt. Resins must be removed by extraction with solvents (diethyl ether, acetone). The wax component of montan is a mixture of long chain ($C_{24}$-$C_{30}$) esters (62-68 wt %), long-chain acids (22-26 wt %), and long chain alcohols, ketones, and hydrocarbons (7-15 wt %). Montan has to go through an extensive chromic acid treatment to be refined, which process, for example, had been banned in California.

Montan wax is hard and brittle and has a high melt point; its properties are similar to those of natural plant waxes such as carnauba, which it can replace. Carbon papers were the largest consumer of crude montan wax. Currently the highest use of montan wax is in car polishes (30%). Additional applications include shoe polishes, electrical insulators, and lubricants in plastics and paper industry. Montan wax in polishes improves scuff resistance, increases water repellence, and imparts high gloss. Depending on refining and derivatization, waxes with different properties can be obtained from montan wax. Because montan wax is extracted from brown coal, the crude wax requires extensive and costly cleaning. Recently the concentration of extractable montan wax in the German rock formations has decreased. Due to the uncertainty of supply and varying nature of the product, as well as its relative high cost, a substitute for montan wax having similar properties to montan wax is desirable.

Carnauba wax is derived from the palm tree, whose wax-producing stands grow almost exclusively in the semiarid northeast section of Brazil. Carnauba wax forms on the fronds of the palm, and is removed by cutting the fronds, drying, and mechanically removing the wax. Impurities are removed from the wax by melting and filtering or centrifuging. Wide fluctuations in price and availability have caused markets served by carnauba wax to seek replacements. The major components of carnauba wax are aliphatic and aromatic esters of long-chain alcohols and acids, with smaller amounts of free fatty acids and alcohols, and resins. Carnauba wax is very hard, with a penetration of 2 dmm at 25° C. and only 3 dmm at 43.3° C. Certain grades of carnauba wax may also have one of the higher melting points for the natural waxes. For example, one grade of carnauba wax has a melting point of 84° C., with a viscosity of 3960 cSt at 98.9° C., an acid number of 8, and a saponification number of 80.

The hardness and high melting point, when combined with its ability to disperse pigments such as carbon black, allows Carnauba wax increasing use in the thermal printing inks. Carnauba wax is also widely used as organic structurant to gel organic solvents and oils, making the wax a valuable component of solvent and oil paste formulations. Carnauba wax polishes to a high gloss and thus is widely used as a polishing agent for items such as leather, candies, and pills. Other uses include cosmetics and investment casting applications (e.g., copper alloys, cast copper alloys).

Candelilla wax is harvested from shrubs in the Mexican states of Coahuila and Chihuahua and, to a very small degree, in the Big Bend region of Texas in the United States. The entire mature plant is uprooted and immersed in boiling water acidified with sulfuric acid. The wax floats to the surface and is filtered. The major components of candelilla wax are hydrocarbons, esters of long-chain alcohols and acids, long-chain alcohols, sterols, and neutral resins, and long-chain acids. Typically, candelilla wax has a melting point of 70° C., a penetration of 3 dmm at 25° C., an acid number of 14, and a saponification number of 55. Principal markets for Candelilla include cosmetics, foods, and pharmaceuticals.

Japan wax is a fat and is derived from the berries of a small tree native to Japan and China cultivated for its wax. Japan wax is composed of triglycerides, primarily tripalmitin. Japan wax typically has a melting point of 53° C., an acid number of 18, and a saponification number of 217. Principal markets include the formulation of candles, polishes, lubricants, and as an additive to thermoplastic resins. The product has some food-related applications.

Ouricury wax is a brown wax obtained from the fronds of a palm tree, which grows in Brazil. Ouricury is difficult to harvest, as it does not flake off the frond as does carnauba wax and must be scraped off. Ouricury is sometimes used as a replacement for carnauba in applications that do not require a light-colored wax. Rice-bran wax is extracted from crude rice-bran oil. It can be degummed, the fatty acid content reduced by solvent extraction, and bleached. The wax is primarily composed of esters of lignoceric acid (43 wt %), behenic acid (16 wt %), and $C_{22}$-$C_{36}$ alcohols (28 wt %).

There is a need for a natural oil fatty acid wax that may completely substitute and/or replace other waxes, such as those identified above, or may be used as an extender for such waxes.

BRIEF SUMMARY

In one embodiment, the method of producing a natural oil based fatty acid wax composition comprises providing a natural oil. The method further comprises hydrogenating and metathesizing the natural oil to obtain a hydrogenated metathesized natural oil. The method further comprises converting the hydrogenated metathesized natural oil to obtain a fatty acid wax comprising free fatty acids and/or salts of fatty acids, glycerol and/or alcohol, and paraffin, wherein the fatty acid wax has at least 50 wt % of carbon chain compositions with at least 18 carbon atoms, and wherein the acid value of the fatty acid wax is greater than 1 mg KOH/g.

In some embodiments, the converting step is conducted by saponification. In certain embodiments, the saponification comprises the use of a phase transfer catalyst. In other embodiments, the converting step is conducted by fat-splitting. In some embodiments, the fat-splitting is carried out by a mechanism selected from the group consisting of the Twitchell process, enzymatic fat-splitting, batch autoclave fat-splitting, and continuous process fat-splitting.

In other embodiments, the method further comprises removing the glycerol and/or alcohol from the fatty acid wax. In yet other embodiments, the method further comprises distilling the fatty acid wax under conditions sufficient to remove at least 80 wt % of the light fraction of the fatty acid wax. In some embodiments, the method further comprising distilling the fatty acid wax under conditions sufficient to remove at least 80 wt % of the light fraction of the fatty acid wax.

In some embodiments, the method comprises forming a fatty acid wax having 85-100 wt % long-chain fatty acids and 0-15 wt % esters, wherein the fatty acid comprises between 15-60 wt % long chain di-acids and 40-85 wt % long chain mono-acids, and wherein the wax has a saponification value greater than 100 mg KOH/g.

In some embodiments, the method comprises forming a fatty acid wax having a needle penetration of 30 dmm or less.

In another embodiment, a natural oil based fatty acid wax comprises 85-100 wt % long-chain fatty acids, 0-15 wt % esters, wherein the fatty acid comprises between 15-60 wt % long chain di-acids and 40-85 wt % long chain mono-acids, and wherein the wax has a saponification value greater than 100 mg KOH/g.

In some embodiments, the natural oil based fatty acid wax has a drop point between 55° C. and 100° C., a needle penetration between 0 dmm and 30 dmm, and a saponification value of from about 200 to about 250 mg KOH/g. In other embodiments the natural oil based fatty acid wax has a saponification number of at least about 200. In yet other embodiments, the natural oil based fatty acid wax comprises less than 5 wt % paraffin. In yet other embodiments, the natural oil based fatty acid wax comprises less than 2 wt % paraffin.

In some embodiments, the natural oil based fatty acid wax has a needle penetration is 10 dmm or less. In other embodiments, the needle penetration is between about 2 and 4.

In other embodiments, the fatty acid comprises from about 90% to about 100% long-chain fatty acids, and from about 0% to about 10% esters. In some embodiments, the fatty acid comprises at least about 95% long-chain fatty acids.

In other embodiments, the natural oil based fatty acid wax composition may comprise about 50-100 wt % long-chain fatty acids and about 0-50 wt % esters, wherein the fatty acid may comprise between about 15-80 wt % long chain di-acids (or about 15-45 wt % linear di-acids as a subset) and about 20-85 wt % long chain monoacids, wherein the wax has a drop point of between about 70° C. and 130° C.

In some embodiments, the natural oil is selected from the group consisting of vegetable oils, algal oils, tall oil and fats, and mixtures thereof. In certain embodiments, the natural oil is hydrogenated and metathesized. In other embodiments, the natural oil is a vegetable oil selected from the group consisting of canola oil, rapeseed oil, coconut oil, corn oil, cottonseed oil, olive oil, palm oil, peanut oil, safflower oil, sesame oil, soybean oil, sunflower oil, linseed oil, palm kernel oil, tung oil, jatropha oil, mustard oil, camelina oil, pennycress oil, castor oil, and mixtures thereof.

DETAILED DESCRIPTION

The present application relates to natural oil fatty acid waxes and methods for manufacturing the same. The acid wax may be derived from hydrogenated natural oil glycerides. The acid wax may be a renewable, natural oil derived wax for use as a replacement and/or extender for traditional waxes, such as montan wax applications. For instance, the acid wax may be used as printing ink additives, toners, polishes, specialty wax emulsions, plastics additives, mold release agents, construction board, as well as many other uses.

Properties of the acid wax include that it is easily ground, emulsifiable, solvent dispersible, potentially water dispersible with additives, provides gloss, and has good slip and mar resistance applications such as plastics, inks, and coatings. The wax may be used as a color dispersant, a nucleating agent, a lubricant, a moisture barrier, mold release agent, and the like.

The following terms, as used herein, have the following meanings:

As used herein, the singular forms "a," "an," and "the" include plural referents unless the context clearly dictates otherwise. For example, reference to "a substituent" encompasses a single substituent as well as two or more substituents, and the like.

As used herein, the terms "for example," "for instance," "such as," or "including" are meant to introduce examples that further clarify more general subject matter. Unless otherwise specified, these examples are provided only as an aid for understanding the applications illustrated in the present disclosure, and are not meant to be limiting in any fashion.

As used herein, the following terms have the following meanings unless expressly stated to the contrary. It is understood that any term in the singular may include its plural counterpart and vice versa:

As used herein, the term "congeal point" may refer to the temperature at which the wax sample being cooled develops a "set" or resistance to flow. At that temperature, the wax may be at or close to the solid state, or it may be semisolid, depending on the composition of the wax being tested. The congeal point may be measured using ASTM-D938, incorporated by reference herein.

As used herein, the term "penetration" or "needle penetration" may refer to the relative hardness of the wax sample at a specified temperature. The needle penetration may be measured using ASTM-D1321-02a, incorporated by reference herein. A higher penetration value indicates a softer wax. Penetration temperatures normally used are 25° C. (77° F.), 38° C. (100° F.), and 43° C. (110° F.).

As used herein, the term "light fraction" may refer to fraction of a mixture that comprises $C_{17}$ and lighter compounds (i.e., lower boiling point components compared to the heavy fraction of the mixture, including, but not limited to, paraffin, "low-molecular-weight olefins," "short chain mono-acids," and the like). In certain embodiments, the light fraction comprises compositions having boiling points less than 200° C. (at 1 mmHg).

As used herein, the term "heavy fraction" may refer to a fraction of a mixture that typically comprises $C_{18}$ and heavier compounds (i.e., higher boiling point components, including but not limited to "long chain di-acids" and "long chain mono-acids"). In certain embodiments, the heavy fraction comprises compositions having boiling points greater than 200° C. (at 1 mmHg).

As used herein, the term "short chain mono-acids" may refer to any one or combination of mono-acids, including monocarboxylic acids, having 17 carbon atoms or less.

As used herein, the term "long chain mono-acids" may refer to any one or combination of mono-acids, including monocarboxylic acids and long chain fatty acids, individually or in combinations thereof, having 18 carbon atoms or more.

As used herein, the term "long chain di-acids" may refer to any one or combination of di-acids, including dicarboxylic acids and long chain fatty acids, individually or in combinations thereof, having 18 carbon atoms or more.

As used herein, the term "metathesis catalyst" may refer to any catalyst or catalyst system that catalyzes a metathesis reaction.

As used herein, the terms "natural oils," "natural feedstocks," or "natural oil feedstocks" refer to oils derived from plants or animal sources. The term "natural oils" includes natural oil derivatives, unless otherwise indicated. Examples of natural oils include, but are not limited to, vegetable oils, algal oils, animal fats, tall oils, derivatives of these oils, combinations of any of these oils, and the like. Representative non-limiting examples of vegetable oils include canola oil, rapeseed oil, coconut oil, corn oil, cottonseed oil, olive oil, palm oil, peanut oil, safflower oil, sesame oil, soybean oil, sunflower oil, linseed oil, palm kernel oil, tung oil, jatropha oil, mustard oil, camelina oil, pennycress oil, and castor oil. Representative non-limiting examples of animal fats include lard, tallow, poultry fat, yellow grease, and fish oil. Tall oils are by-products of wood pulp manufacture. In certain embodiments, the natural oil may be refined, bleached, and/or deodorized.

As used herein, the term "natural oil derivatives" refers to the compounds or mixture of compounds derived from the natural oil using any one or combination of methods known in the art. Such methods include saponification, transesterification, esterification, hydrogenation (partial or full), isomerization, oxidation, and reduction. Representative non-limiting examples of natural oil derivatives include gums, phospholipids, soapstock, acidulated soapstock, distillate or distillate sludge, fatty acids and fatty acid alkyl ester (e.g., non-limiting examples such as 2-ethylhexyl ester), hydroxy substituted variations thereof of the natural oil. For example, the natural oil derivative may be a fatty acid methyl ester ("FAME") derived from the glyceride of the natural oil. In some embodiments, a feedstock includes canola or soybean oil, as a non-limiting example, refined, bleached, and deodorized soybean oil (i.e., RBD soybean oil). Soybean oil typically comprises about 95% weight or greater (e.g., 99% weight or greater) triglycerides of fatty acids. Major fatty acids in the polyol esters of soybean oil include saturated fatty acids, as a non-limiting example, palmitic acid (hexadecanoic acid) and stearic acid (octadecanoic acid), and unsaturated fatty acids, as a non-limiting example, oleic acid (9-octadecenoic acid), linoleic acid (9,12-octadecadienoic acid), and linolenic acid (9,12,15-octadecatrienoic acid).

As used herein, the terms "metathesize" and "metathesizing" may refer to the reacting of a feedstock in the presence of a metathesis catalyst to form a metathesized product or "metathesized natural oil" comprising new olefinic compounds or complex mixtures of various compounds. Metathesizing may refer to cross-metathesis (a.k.a. co-metathesis), self-metathesis, ring-opening metathesis, ring-opening metathesis polymerizations ("ROMP"), ring-closing metathesis ("RCM"), and acyclic diene metathesis ("ADMET"). As a non-limiting example, metathesizing may refer to reacting two triglycerides present in a natural feedstock (self-metathesis) in the presence of a metathesis catalyst, wherein each triglyceride has an unsaturated carbon-carbon double bond, thereby forming a "natural oil oligomer" having a new mixture of olefins and esters that may comprise one or more of: metathesis monomers, metathesis dimers, metathesis trimers, metathesis tetramers, metathesis pentamers, and higher order metathesis oligomers (e.g., metathesis hexamers) plus metathesis byproducts such as olefins or paraffins.

As used herein, the term "metathesized natural oil" refers to the product formed from the metathesis reaction of a natural oil in the presence of a metathesis catalyst to form a mixture of olefins and esters comprising one or more of: metathesis monomers, metathesis dimers, metathesis trimers, metathesis tetramers, metathesis pentamers, and higher order metathesis oligomers (e.g., metathesis hexamers). In certain embodiments, the metathesized natural oil has been partially to fully hydrogenated, forming a "hydrogenated metathesized natural oil." In certain embodiments, the metathesized natural oil is formed from the metathesis reaction of a natural oil comprising more than one source of natural oil (e.g., a mixture of soybean oil and palm oil). In other embodiments, the metathesized natural oil is formed from the metathesis reaction of a natural oil comprising a mixture of natural oils and natural oil derivatives.

As used herein, the terms "ester" and "esters" may refer to compounds having the general formula: R—COO—R', wherein R and R' denote any alkyl or aryl group, including those bearing a substituent group. In certain embodiments, the term "ester" or "esters" may refer to a group of compounds with the general formula described above, wherein the compounds have different carbon lengths. In certain embodiments, esters may refer to triglycerides, diglycerides, monoglycerides, or oligomers therefrom, or fatty acid methyl esters ("FAME"), or $C_{10}$-$C_{15}$ esters, $C_{15}$-$C_{18}$ esters, or $C_{18+}$ esters, or diesters therefrom, wherein such esters may occur as free esters or in combinations thereof.

As used herein, the terms "olefin" and "olefins" may refer to hydrocarbon compounds having at least one unsaturated carbon-carbon double bond. In certain embodiments, the term "olefin" or "olefins" may refer to a group of unsaturated carbon-carbon double bond compounds with different carbon lengths. It is noted that an olefin may also be an ester, and an ester may also be an olefin, if the R or R' group contains an unsaturated carbon-carbon double bond. Unless specified otherwise, an olefin refers to compounds not containing the ester functionality, while an ester may include compounds containing the olefin functionality.

As used herein, the term "low-molecular-weight olefin" may refer to any one or combination of unsaturated straight, branched, or cyclic hydrocarbons in the $C_2$ to $C_{14}$ range. Low-molecular-weight olefins include "alpha-olefins" or "terminal olefins," wherein the unsaturated carbon-carbon bond is present at one end of the compound. Low-molecular-weight olefins may also include dienes or trienes. Examples of low-molecular-weight olefins in the $C_2$ to $C_6$ range include, but are not limited to: ethylene, propylene, 1-butene, 2-butene, isobutene, 1-pentene, 2-pentene, 3-pentene, 2-methyl-1-butene, 2-methyl-2-butene, 3-methyl-1-butene, cyclopentene, 1-hexene, 2-hexene, 3-hexene, 4-hexene, 2-methyl-1-pentene, 3-methyl-1-pentene, 4-methyl-1-pentene, 2-methyl-2-pentene, 3-methyl-2-pentene, 4-methyl-2-pentene, 2-methyl-3-pentene, and cyclohexene. Other possible low-molecular-weight olefins include styrene and vinyl cyclohexane. In certain embodiments, it is preferable to use a mixture of olefins, the mixture comprising linear and branched low-molecular-weight olefins in the $C_4$-$C_{10}$ range. In one embodiment, it may be preferable to use a mixture of linear and branched $C_4$ olefins (i.e., combinations of: 1-butene, 2-butene, and/or isobutene). In other embodiments, a higher range of $C_{11}$-$C_{14}$ may be used.

As used herein, the terms "paraffin" and "paraffins" may refer to hydrocarbon compounds having only single carbon-carbon bonds, having the general formula $C_nH_{2n+2}$, where, in certain embodiments, n is greater than about 18.

As used herein, "saponification" may refer to the hydrolysis of an ester under basic conditions to form an alcohol and the salt of a carboxylic acid (carboxylates). Saponification is commonly used to refer to the reaction of a metallic compound (base) with a fat or oil to form soap.

As used herein, "saponification value," "saponification number," or "SAP" may refer to the number of milligrams of alkali metal hydroxide, such as potassium hydroxide or sodium hydroxide required to saponify 1 gram of fat under the conditions specified. It is a measure of the average molecular weight (or chain length) of all the fatty acids present.

As used herein, "acid value" or "acid number" may refer to the amount of free fatty acids in a compound or a mixture of compounds. The acid number refers to the number of milligrams of alkali metal hydroxide, such as potassium hydroxide, required to neutralize the free fatty acids in 1 gram of oil. The acid number is a measure of the amount of carboxylic acid groups in a chemical compound, such as a fatty acid, or in a mixture of compounds.

As used herein, "dropping point," "drop point," "melting point," or "drop melting point" may refer to the temperature at which a material becomes sufficiently fluid to drop from the thermometer used in making the determination under prescribed conditions, and may be measured by the Mettler Drop Point FP80 system or ASTM D-127, "Standard Test Method for Drop Melting Point of Petroleum Wax, including Petrolatum." Specimens may be deposited on two thermometer bulbs by dipping chilled thermometers in to the sample. The thermometers bearing the specimens are placed in test tubes and heated by means of a water bath until the specimens melt and the first drop falls from each thermometer bulb. The average of the temperatures at which these drops falls is the drop melting point. This test is often used to measure the melting characteristics of petrolatum and other high viscosity petroleum waxes.

As used herein "long-chain fatty acid" may refer to a fatty acid where the majority (>50 wt %) of the acid comprises chain lengths of at least 18 carbon atoms, and may include long chain mono-acids and long chain di-acids, individually or in combinations thereof.

A natural oil based fatty acid wax is disclosed. As used herein, the natural oil based fatty acid wax may also be referred to interchangeably herein as a natural oil fatty acid wax, a renewable fatty acid wax, an acid wax, or a fatty acid wax. The acid wax may be derived from hydrogenated metathesized natural oils. The acid wax may be a renewable, natural oil derived wax for use as a replacement and/or extender for traditional waxes, such as montan wax applications, such as printing ink additives, toners, polishes, specialty wax emulsions, plastics additives, mold release agents, construction board, as well as many other uses.

In certain embodiments, the acid wax has a high melting point and hardness, and is free or substantially free of any unpleasant odors that may be present with, for example, montan wax. The natural oil fatty acid wax predominantly comprises (at least 50%) long-chain fatty acids, and a minor amount of esters. Preferably, the natural oil fatty acid wax comprises substantially all long-chain fatty acids, typically from about 85% to about 100% long chain fatty acids, and in some embodiments, about 90% to about 100% long chain fatty acids and a minor amount of esters, typically from about 0% to about 15% esters, and in some embodiments, from about 0% to about 10% esters. In certain embodiments, the long chain fatty acids comprise from about 15% to about 60% long chain di-acids and from about 40% to about 85% long chain mono-acids. In certain embodiments, acid wax composition may comprise about 50-100 wt % long-chain fatty acids and about 0-50 wt % esters, wherein the fatty acid may comprise between about 15-80 wt % long chain di-acids (or about 15-45 wt % linear di-acids as a subset) and about 20-85 wt % long chain monoacids.

The starting material for the natural oil fatty acid wax may be a natural oil or a blend of natural oils, or natural oil derivatives, such as fatty acids or fatty acid esters. The oils can have their fatty acid distribution function controlled or altered by several processes including, but not limited to, genetic engineering, hydrogenation, blending, transesterification, and/or refining, for example, by winterization and metathesis. Traditional plant breeding also can impact fatty acid distribution.

The natural oil fatty acid wax may completely replace other waxes, such as those identified above, or it may be used as an extender for such waxes. In one particular embodiment the starting material is natural oil that has been metathesized and/or hydrogenated as described below. The natural oil may be partially hydrogenated and then metathesized, or it may be metathesized and then partially or fully hydrogenated. The main components of the metathesized and hydrogenated wax, depending on the embodiment, include triglycerides and oligomers thereof.

Depending on the natural oil used, the crude acid profile may comprise from about 15 wt % to about 45 wt % linear di-acids with terminal carboxylic groups, e.g., HOOC—$(CH_2)_{16}$—COOH. Some embodiments are comprised mainly of $C_{18}$, $C_{21}$, and/or $C_{24}$ di-acids. Other embodiments also may include di-acids with chain lengths of up to $C_{30}$. In some embodiments, the crude acid profile includes between about 45 wt % to about 75 wt % linear monoacids with chain lengths according to the acid profile of the oil used, for example, mainly $C_{16}$ and $C_{18}$ for soybean oil, and shorter chain mono-acids that may be due to dimerization and metathesis of unsaturated di-acids with low-molecular-weight olefins during metathesis. In certain embodiments, the acid profile comprises between about 0 wt % to about 50 wt % esters, such as triglycerides, diglycerides, monoglycerides, or oligomers. In other embodiments, the acid profile comprises about 0 wt % to about 15 wt % of triglycerides, diglycerides, monoglycerides, or oligomers. In some embodiments, the acid profile comprises between about 3 wt % to about 12 wt % paraffin. In some embodiments, the acid profile comprises between about 0 wt % to about 5 wt % free glycerol.

In certain embodiments, the crude acid is thereafter stripped or separated using any conventional means known in the art, including, but not limited to, distillation, steam stripping and/or vacuum stripping, wiped film evaporation, and the like. In some embodiments, the crude acid may be stripped or separated using the aforementioned conventional means, prior to any subsequent saponification or neutralization.

In certain embodiments, the starting natural oil composition is derived from vegetable oil, algal oil, animal fat, tall oil, derivatives of these oils, or mixtures thereof. Representative non-limiting examples of vegetable oils include canola oil, rapeseed oil, coconut oil, corn oil, cottonseed oil, olive oil, palm oil, peanut oil, safflower oil, sesame oil, soybean oil, sunflower oil, linseed oil, palm kernel oil, tung oil, jatropha oil, mustard oil, camelina oil, pennycress oil, and castor oil. Representative non-limiting examples of animal fats include lard, tallow, poultry fat, yellow grease, and fish oil. Representative non-limiting examples of natural oil derivatives include metathesis oligomers, gums, phospholipids, soapstock, acidulated soapstock, distillate or distillate sludge, fatty acids and fatty acid alkyl ester (e.g. non-limiting examples such as 2-ethylhexyl ester), hydroxy substituted variations thereof of the natural oil. For example, the natural oil derivative may be a fatty acid methyl ester ("FAME") derived from the glyceride of the natural oil. In some embodiments, a natural oil feedstock includes canola or soybean oil, as a non-limiting example, refined, bleached, and deodorized soybean oil (i.e., RBD soybean oil). Soybean oil typically comprises about 95% weight or greater (e.g., 99% weight or greater) triglycerides of fatty acids. Major fatty acids in the polyol esters of soybean oil include saturated fatty acids, as a non-limiting example, palmitic acid (hexadecanoic acid) and stearic acid (octadecanoic acid), and unsaturated fatty acids, as a non-limiting example, oleic acid (9-octadecenoic acid), linoleic acid (9,12-octadecadienoic acid), and linolenic acid (9,12,15-octadecatrienoic acid).

The natural oil may be metathesized and then partially or fully hydrogenated, or partially hydrogenated and then metathesized. Due to metathesis and hydrogenation, the hydrogenated metathesized oil is a mixture of triglyceride oligomers and paraffin.

The metathesis reaction is conducted in the presence of a catalytically effective amount of a metathesis catalyst. The metathesis catalyst may include any catalyst or catalyst system that catalyzes a metathesis reaction. Any known metathesis catalyst may be used, alone or in combination with one or more additional catalysts. Non-limiting exemplary metathesis catalysts and process conditions are described in PCT/US2008/009635, pp. 18-47, incorporated by reference herein. A number of the metathesis catalysts as shown are manufactured by Materia, Inc. (Pasadena, Calif.).

The hydrogenation reaction is conducted in the presence of a catalytically effective amount of a hydrogenation catalyst. Any known hydrogenation catalysts may be used, alone or in combination with one or more additional catalysts. Non-limiting exemplary hydrogenation catalysts and process conditions are described in PCT/US2007/000610 and PCT/US2008/009635, pp. 47-51, incorporated by reference herein.

Representative examples of hydrogenated metathesized natural oils include hydrogenated metathesized vegetable oil, hydrogenated metathesized algal oil, hydrogenated metathesized animal fat, hydrogenated metathesized tall oil, hydrogenated metathesized derivatives of these oils, and mixtures thereof. In one embodiment, the hydrogenated metathesized vegetable oil is hydrogenated metathesized canola oil, hydrogenated metathesized rapeseed oil, hydrogenated metathesized coconut oil, hydrogenated metathesized corn oil, hydrogenated metathesized cottonseed oil, hydrogenated metathesized olive oil, hydrogenated metathesized palm oil, hydrogenated metathesized peanut oil, hydrogenated metathesized safflower oil, hydrogenated metathesized sesame oil, hydrogenated metathesized soybean oil, hydrogenated metathesized sunflower oil, hydrogenated metathesized linseed oil, hydrogenated metathesized palm kernel oil, hydrogenated metathesized tung oil, hydrogenated metathesized jatropha oil, hydrogenated metathesized mustard oil, hydrogenated metathesized camelina oil, hydrogenated metathesized pennycress oil, hydrogenated metathesized castor oil, hydrogenated metathesized derivatives of these oils, and mixtures thereof. In another embodiment, the hydrogenated metathesized natural oil is a hydrogenated metathesized animal fat such as hydrogenated metathesized lard, hydrogenated metathesized tallow, hydrogenated metathesized poultry fat, hydrogenated metathesized fish oil, hydrogenated metathesized derivatives of these oils, and mixtures thereof. In certain embodiments, the representative examples of hydrogenated metathesized natural oil have been fully hydrogenated.

In one particular embodiment, the natural oil is a hydrogenated metathesized soybean oil ("HMSBO"). In particular, S-55 is a hydrogenated metathesized soybean oil available from Elevance Renewable Sciences, Woodridge, Ill. In one embodiment the HMSBO has a drop point of about 54° C. (129° F.), a congeal point of about 52° C. (126° F.) and a needle penetration of about 13 dmm. In this embodiment, the paraffin comprises mostly octadecane and has a melt point of 27° C., and a boiling point of 317° C. In another embodiment, the natural oil is a hydrogenated metathesized soybean oil (HMSBO) that has been vacuum stripped to remove paraffins. In particular, this vacuum stripped version of HMSBO, S-60, is a hydrogenated metathesized soybean oil available from Elevance Renewable Sciences, Woodridge, Ill. In one embodiment, this vacuum stripped HMSBO has a drop point of about 54° C. (129° F.) and a needle penetration of about 1.4 dmm. For the purposes of this document, this vacuum stripped HMSBO shall also be included in the general definition of HMSBO.

In some embodiments, the natural oil is a metathesized palm oil that has been transesterified and distilled to generate a fraction of a mixture of triglycerides and fatty acid esters, such as $C_{10}$-$C_{15}$ esters, $C_{15}$-$C_{18}$ esters, or $C_{18+}$ esters, or diesters, wherein such esters may occur as free esters or in combinations thereof. In some embodiments, this mixture is hydrogenated and has a drop point of about 39° C. and a needle penetration of about 35 dmm.

In certain embodiments, the hydrogenated metathesized oil is converted to the natural oil fatty acid wax via a fat splitting or saponification/neutralization reaction mechanism. The acid profile of the metathesized and hydrogenated wax helps determine the final fatty acid wax product properties.

Hydrogenated metathesized oil is a mixture of compounds of at least two general types: paraffinic compounds and triglycerides of long-chain mono-carboxylic and di-carboxylic acids and oligomers thereof. The paraffinic compounds do not react under any fat splitting conditions and exit the reaction unaltered. Depending on the application, the paraffinic compounds can be partly or fully removed. Triglycerides and oligomers thereof are reacting with water or $OH^-/H^+$ giving mainly free fatty acids corresponding to the hydrogenated metathesized oil fatty acid profile (mono- and di-acids) and glycerol leaving small amounts of partially hydrolyzed hydrogenated metathesized oil composed of diglycerides, monoglycerides, and oligomers thereof.

In some embodiments, the metathesized natural oil may be epoxidized. The metathesized natural oil may be epoxidized via any suitable peroxyacid. Peroxyacids (peracids) are acyl hydroperoxides and are most commonly produced by the acid-catalyzed esterification of hydrogen peroxide. Any peroxyacid may be used in the epoxidation reaction. Examples of hydroperoxides that may be used include, but are not limited to, peracetic acid, performic acid, m-dichloroperbenzoic acid, hydrogen peroxide, tert-butylhydroperoxide, triphenylsilylhydroperoxide, cumylhydroperoxide, and hydrogen peroxide.

Saponification/Neutralization Process

Figure 1:
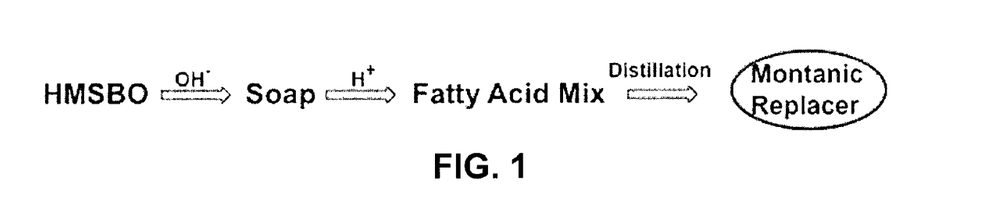
FIG. 1 generally shows a saponification process for producing natural oil fatty acid waxes.

The saponification and neutralization reaction mechanism (collectively referred to as "saponification") is depicted in FIG. 1. Saponification of the metathesized and/or hydrogenated natural oil includes a hydrolysis reaction of the esters in the oil with a metal alkoxide, metal oxide, metal hydroxide or metal carbonate, preferably a metal hydroxide to form salts of the fatty acids ("soaps") and free glycerol. Non-limiting examples of metals include alkaline earth metals, alkali metals, transition metals, and lanthanoid metals, individually or in combinations thereof. Any number of known metal hydroxide compositions may be used in this saponification reaction. In certain embodiments, the hydroxide is an alkali metal hydroxide. In one embodiment, the metal hydroxide is sodium hydroxide. In another embodiment, the metal hydroxide is potassium hydroxide.

In certain embodiments, the saponification reaction may be conducted at 50° C.-120° C., 50° C.-80° C., 80° C.-100° C., or 90° C.-95° C. Reaction times may vary from several minutes to 3-4 days. Higher reaction temperatures typically reduce the overall reaction time.

In certain embodiments, the saponification reaction can be sped up through the introduction of a phase transfer catalyst to bring the base into the oil phase. This allows the reaction to be completed in a much more efficient manner. Any number of known phase transfer catalysts may be used in this reaction. In some embodiments, the phase transfer catalyst is a tetraalkylammonium salt or crown ethers and linear poly-ethers. In one particular embodiment, the phase transfer catalyst is tetrabutylammonium bromide.

In certain embodiments, the amount of phase transfer catalyst used in the reaction is between approximately 0.01-10 parts by weight catalyst per 100 parts by weight of the hydrogenated metathesized natural oil. In other embodiments, the amount of catalyst is between approximately 0.1-5 parts by weight, 0.5-3 parts by weight, or 1-2 parts by weight catalyst.

Following the saponification reaction (with or without a phase transfer catalyst), the salts of the fatty acids may be neutralized with an acid composition to form a fatty acid wax. Any number of known acid compositions may be used in this neutralization reaction. In certain embodiments, phosphoric acid or hydrochloric acid may be used as the acid. The compositions of these fatty acid waxes match the acid profile of the metathesized and hydrogenated wax. Additionally, the product mixture may contain metathesis byproducts, such as paraffin, e.g., octadecane.

Neutralization may be accomplished at 50° C.-100° C., 50° C.-80° C., 80° C.-100° C., or 90° C.-95° C. In certain embodiments, the neutralization reaction is slowly conducted over a period of 1-4 hours in order to prevent foaming of the reactor contents.

Fat Splitting (Direct Hydrolysis Process)

Figure 2:
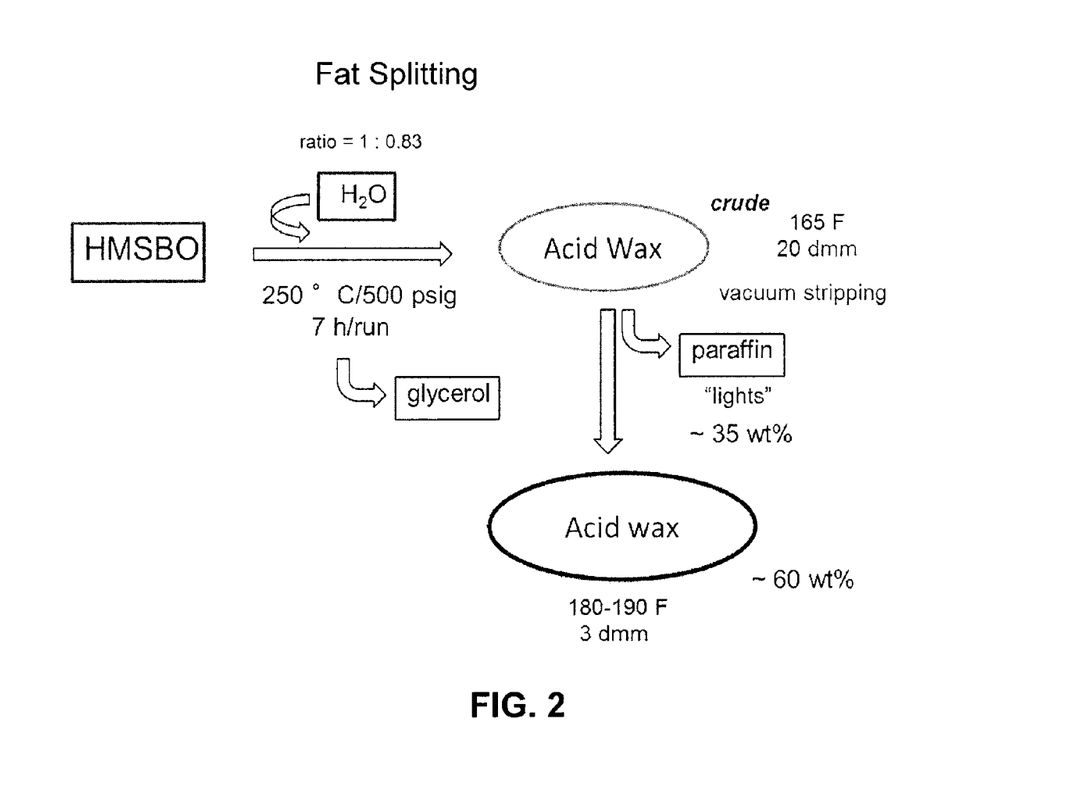
FIG. 2 generally shows a fat splitting process for producing natural oil fatty acid waxes.

In certain embodiments, the fatty acid wax may be formed through a fat splitting reaction mechanism. One embodiment of a fat splitting reaction mechanism is depicted in FIG. 2. In one embodiment, the fatty acid wax may be produced from hydrogenated metathesized natural oil by direct hydrolysis. In some cases, this involves approximately a 1:1 mixture by weight of the hydrogenated metathesized oil and water. Additionally, the fat splitting reaction is conducted at elevated temperatures, e.g., 150° C.-300° C., 200° C.-250° C., or approximately 230° C. In some embodiments, the fat splitting reaction is conducted at elevated pressure, e.g., 5-50 atm, 20-40 atm or 27-31 atm. Typically, at elevated temperature and pressure, the fat splitting reaction is conducted for approximately 0.5-10 hours, 1-5 hours, or 2.5 hours. The fat splitting reaction mechanism may be performed by any conventional means known in the art, non-limiting examples of which include the Twitchell process, enzymatic fat-splitting, batch autoclave fat-splitting, and continuous process fat-splitting.

Separation/Distillation

In certain embodiments, following saponification or fat splitting of the hydrogenated metathesized natural oil, the fatty acid wax product may be further processed. In certain embodiments, the glycerol and/or alcohol in the fatty acid wax may be separated with the aqueous phase and not be part of the product mixture.

This separation process may be repeated to further improve the yield of fatty acid wax. In some embodiments, the fatty acid wax yield may be greater than 70 wt %, 80 wt %, 90 wt %, or 95 wt %.

In certain embodiments, following the saponification or fat splitting reaction (and in some embodiments, following the separation of glycerol and/or alcohol), the fatty acid wax may be distilled to remove byproducts in the light fraction of the fatty acid wax, e.g., paraffin. Due to the metathesis reaction of the natural oil, the fatty acid wax product may comprise paraffin, mono- and di-carboxylic acids. Paraffin may act as a plasticizer and significantly lower the drop point and hardness of the material. In order to improve the properties and increase the commercial value of the fatty acid wax, paraffin may be removed by vacuum distillation at elevated temperatures. Drop point and hardness of the fatty acid wax increase with the degree of distillation; therefore, with higher temperature, more low boiling compounds are removed. In certain embodiments, approximately 10 wt %, 15 wt %, 20 wt %, 25 wt %, 30 wt %, 35 wt %, or 40 wt % of the overall fatty acid wax is removed in the light fraction via distillation in order to achieve the targeted drop point of the fatty acid wax. In certain embodiments, at least 70 wt %, 80 wt %, 90 wt %, or 95 wt % of the $C_{18}$ and lighter compounds are removed from the fatty acid wax composition to achieve the targeted drop point of the fatty acid wax. In some embodiments, the desired drop point for the fatty acid wax is about 75° C.-90° C. or 80° C.-85° C. In some embodiments, the drop point of the removed light fraction is crude acid wax is about 70° C.-80° C. or 72° C.-78° C.

Fatty Acid Wax Composition and Properties

The acid wax composition may comprise about 85-100 wt % long-chain fatty acids and about 0-15 wt % esters, wherein the fatty acid may comprise between about 15-60 wt % long chain di-acids and about 40-85 wt % long chain mono-acids. In certain embodiments, acid wax composition may comprise about 50-100 wt % long-chain fatty acids and about 0-50 wt % esters, wherein the fatty acid may comprise between about 15-80 wt % long chain di-acids (or about 15-45 wt % linear di-acids as a subset) and about 20-85 wt % long chain mono-acids. In certain embodiments, the acid wax composition may be blended with additional fatty acids having from 6 to 24 carbon atoms, including, but not limited to, caproic acid, caprylic acid, capric acid, lauric acid, myristic acid, palmitic acid, oleic acid, linoleic acid, linolenic acid, stearic acid, arachidic acid, erucic acid, lignoceric acid, and behenic acid.

In certain embodiments, the fatty acid wax may have a drop point between about 158° F.-266° F. (70° C. and 130° C.), 131° F.-212° F. (55° C.-100° C.), 150° F.-200° F. (66° C.-93° C.), 170° F.-190° F. (77° C.-88° C.), 176° F.-185° F. (80° C.-85° C.), 208-210° F. (98-99° C.), or 160° F.-194° F. (71° C.-90° C.).

In some embodiments, the fatty acid wax has a needle penetration between 0-30 dmm, 0-20 dmm, about 10 dmm or less, about 5 dmm or less, or between 2-4 dmm at 25° C. (77° F.). In certain embodiments, the fatty acid wax has a saponification value of greater than 100 mg KOH/g, between 150-250 mg KOH/g, or between 190-250 mg KOH/g.

In other embodiments, the fatty acid wax has an acid value between 1-270 mg KOH/g, between 1-150 mg KOH/g, between 1-100 mg KOH/g, or between 10-50 mg KOH/g. The color of the wax may be cream to light tan, or yellow to dark brown.

EXAMPLES

The following examples are presented to illustrate the metathesis of natural oils, including soybean oil and palm oil. The examples are not intended in any way to limit the scope of the invention.

Example 1

Typical Product Composition

Five Parr (direct fat splitting runs) were performed on HMSBO to determine the composition of the fatty acid wax product. Calculations were compiled from GC-MS data. Before any stripping or separation was conducted, the "crude" fatty acid wax composition comprised:

19-26 wt % linear di-acids with terminal carboxylic groups (e.g., HOOC—$(CH_2)_{16}$—COOH) composed of $C_{18}$, $C_{21}$, and $C_{24}$ and higher;

56-66 wt % linear monoacids with chain lengths according to the acid profile in the oil feedstock, e.g., mainly $C_{16}$ and $C_{18}$ for soybean oil, and shorter chain mono-acids due to dimerization and metathesis of unsaturated di-acids with low-molecular-weight olefins during metathesis;

0-9 wt % triglycerides, diglycerides, monoglycerides, oligomers;

7-9 wt % paraffin; and 0-1 wt % free glycerol.

After a stripping/separation step was performed, the "refined" fatty acid wax composition comprised:

28-39 wt % linear di-acids with terminal carboxylic groups (e.g., HOOC—$(CH_2)_{16}$—COOH) composed of $C_{18}$, $C_{21}$, and $C_{24}$ and higher;

52-66 wt % linear monoacids with chain lengths according to the acid profile in the oil feedstock, e.g., mainly $C_{16}$ and $C_{18}$ for soybean oil, and shorter chain mono-acids due to dimerization and metathesis of unsaturated di-acids with low-molecular-weight olefins during metathesis;

10 wt % triglycerides, diglycerides, monoglycerides, oligomers; and 0-2 wt % paraffin.

The stripped fraction (byproduct/waste stream) comprised the following:

1-9 wt % linear di-acids with terminal carboxylic groups (e.g., HOOC—$(CH_2)_{16}$—COOH) composed of $C_{18}$, $C_{21}$, and $C_{24}$ and higher;

56-76 wt % linear monoacids with chain lengths according to the acid profile in the oil feedstock, e.g., mainly $C_{16}$ and $C_{18}$ for soybean oil, and shorter chain mono-acids due to dimerization and metathesis of unsaturated di-acids with low-molecular-weight olefins during metathesis;

16-30 wt % paraffin; and 0-1 wt % free glycerol.

Residual partly hydrolyzed HMSBO was not captured by the GC-MS method due to sample preparation (transesterification), but can be quantitatively analyzed by AV/SAP=degree of conversion, SAP−AV=ester value, wherein AV is acid value and SAP is degree of saponification.

Example 2

Exemplary Fat Splitting Reaction

In one exemplary method of obtaining the fatty acid wax of the present invention, HMSBO was subjected to a fat splitting reaction to obtain a fatty acid wax. In this example, the composition of these fatty acids matches the profile of the starting material, (i.e., the hydrogenated metathesized soybean oil). The product was a high melting point fatty acid wax that may replace montan wax and also was miscible with montan wax. In one example, the composition of the acid wax by fat-splitting is set forth in Table 1, below:

TABLE 1

| Composition of Wax by Fat-Splitting | |
|---|---|
| 3.87% | Pentadecanoic acid |
| 5.94% | Hexadecanoic acid |
| 28.35% | Octadecanoic acid |
| 1.71% | Eicosanoic acid |
| 16.82% | Heneicosanoic acid |
| 1.39% | Docosanoic acid |
| 6.98% | Tetracosanoic acid |
| 34.93% | Octadecanedioic acid |

Example 3

Exemplary Saponification Reaction

In another method of obtaining the fatty acid wax of the present invention, the HMSBO fatty acid mixture was saponified with an alkali metal hydroxide to obtain a mixture of the salts of fatty acids and free glycerol. Subsequent neutralization of the salts with mineral acids, for example hydrochloric acid, gives the free fatty acids derived from the HMSBO. The composition of these fatty acids matches the profile of the starting material. Additionally, the product after neutralization also may contain metathesis byproducts, such as paraffin (e.g., octadecane) and other lower boiling point components. Because paraffin acts as a plasticizer and drops the melt point of the wax, it is preferred to be removed. The paraffin and other lower boiling point materials were removed from the neutralized mixture by distillation, for example vacuum distillation. In one example, the composition of the acid wax by a saponification method is set forth in Table 2, below:

TABLE 2

| Composition of Wax by Saponification | |
|---|---|
| 1.91% | Octadecane |
| 1.29% | Dodecanoic acid |
| 1.43% | Heneicosane |
| 20.10% | Pentadecanoic acid |
| 17.09% | Hexadecanoic acid |
| 0.79% | Heptadecanoic acid |
| 0.57% | Tetracosane |
| 29.00% | Octadecanoic acid |
| 1.07% | Eicosanoic acid |
| 0.15% | Heptacosane |
| 8.66% | Heneicosanoic acid |
| 0.27% | Pentadecanoic acid |
| 0.71% | Docosanoic acid |
| 16.97% | Octadecanedioic acid |

Example 3A

Saponification Reaction—Hydrogenated Fatty Acid Methyl Esters

In another method of obtaining the fatty acid wax of the present invention, a hydrogenated metathesized palm oil ester bottoms mixture was saponified with an alkali metal hydroxide in an aqueous 2-propanol solution to obtain a mixture of the salts of fatty acids, free methanol and free glycerol. Subsequent neutralization of the salts with mineral acids, for example hydrochloric acid, gave the free fatty acids derived from the hydrogenated metathesized palm oil ester bottoms. The composition of the fatty acids matched the profile of the starting material. Additionally, the product after neutralization may also contain metathesis byproducts, such as paraffin and other lower boiling point materials. Because this wax has a high drop point, for example, 98° C., alkali salts must be removed via aqueous extraction near the boiling temperature of water. In order to minimize the reformation of esters during this step, any residual methanol or 2-propanol was first removed via distillation, for example vacuum distillation. In one example, the composition of the acid wax by a saponification method is set forth in the Table 2A below.

TABLE 2A

Composition of hydrogenated metathesized palm oil ester bottoms by saponification

| | |
|---|---|
| Decanoic Acid | 0.69% |
| Dodecanoic Acid | 0.52% |
| 9-Dodecenoic Acid | 0.29% |
| Tridecanoic Acid | 0.04% |
| Tridecenoic Acid | 0.02% |
| Tetradecanoic Acid | 0.19% |
| Pentadecanoic Acid | 0.18% |
| Pentadecenoic Acid | 0.25% |
| Methyl Hexadecanoate | 0.23% |
| Hexadecanoic Acid | 23.02% |
| Octadecanoic Acid | 14.16% |
| Eicosanoic Acid | 2.23% |
| Heneicosanoic acid | 3.43% |
| Heneicosenoic acid | 0.17% |
| Docosanoic Acid | 0.82% |
| Octadecandioic Acid | 38.73% |
| Tetracosanoic Acid | 1.41% |
| Eicosandioic Acid | 2.03% |
| Heneicosandioic Acid | 4.01% |
| alpha tocopherol | 0.17% |
| Tetracosandioic Acid | 0.32% |
| gamma tocotrienol | 0.17% |
| campesterol | 0.12% |
| beta sitosterol | 0.13% |
| Uncharacterized | 6.66% |

The acid wax derived from the above mentioned, hydrogenated metathesized palm oil ester bottoms mixture had the following material properties as shown in Table 2B below.

TABLE 2B

Material properties of hydrogenated metathesized palm oil ester bottoms mixture.

| | Typical Montan Wax | Clariant Licowax ®LP (as measured) | FAME | Free fatty acid |
|---|---|---|---|---|
| Drop Point ° F. (° C.) | 180 (82) | 185 (85) | 103 (39) | 209 (98) |
| Viscosity cP (° C.) | 15-30 (100) | 22 (100) | 6 (100) | 14-17 (105) |
| Needle Penetration (dmm) | 1 | 1.2 | 34.6 | 24.2 |
| Carbon # | C24-34 | C10-30 | C16-24 (~50% TAG) | C16-24 <5% C10-15 |

Example 3B

Saponification Reaction—S60 Stripped HMSBO

In another method of obtaining the fatty acid wax of the present invention, the S-60 HMSBO fatty acid mixture was saponified with an alkali metal hydroxide in an aqueous 2-propanol solution to obtain a mixture of the salts of fatty acids, free methanol and free glycerol. Subsequent neutralization of the salts with mineral acids, for example hydrochloric acid, gave the free fatty acids derived from the hydrogenated palm ester bottoms. The composition of the fatty acids matched the profile of the starting material. Additionally, the product after neutralization may also contain metathesis byproducts, such as paraffin and other lower boiling point materials. Because the product wax has a high drop point, for example, 77° C., alkali salts must be removed via aqueous extraction near the boiling temperature of water. In order to minimize the reformation of esters during this step, any residual methanol or 2-propanol was first removed via distillation, for example vacuum distillation. In one example, the composition of the acid wax by a saponification method is set forth in the Table 2C below.

TABLE 2C

Composition of S-60 wax by saponification

| | |
|---|---|
| Dodecane | 0.34% |
| Dodecanoic Acid | 2.29% |
| Octadecane | 0.91% |
| Tetradecanoic Acid | 0.19% |
| Pentadecanoic Acid | 17.92% |
| Pentadecenoic Acid | 0.38% |
| Heneicosane | 0.92% |
| Hexadecanoic Acid | 14.31% |
| Heptadecanoic Acid | 0.60% |
| Octadecanoic Acid | 22.10% |
| Tetracosane | 0.57% |
| Nonadecanoic Acid | 0.28% |
| Eicosanoic Acid | 0.78% |
| Heneicosanoic acid | 6.96% |
| Octadecandioic Acid | 13.54% |
| Tetracosanoic Acid | 2.91% |
| Eicosandioic Acid | 0.73% |
| Heneicosandioic Acid | 6.78% |
| Heptacosane | 1.06% |
| Octacosane | 0.36% |
| Tetracosandioic Acid | 2.79% |
| Triacontane | 0.38% |
| Sitosterol | 0.17% |
| Hexacosandioc Acid | 0.10% |
| Heptacosandioic Acid | 0.79% |
| Tritriacontanoic acid | 0.13% |
| Uncharacterized | 1.72% |

Example 3C

Blending of Acid Waxes and Fatty Acids

In another method of obtaining the fatty acid wax of the present invention, an acid wax generated via the saponification and neutralization of hydrogenated metathesized palm oil ester bottoms was blended with additional fatty acids, for example stearic acid. The respective acid waxes and fatty acids were combined via melting and subsequent stirring.

The fatty acid wax derived from the above mentioned, hydrogenated metathesized palm oil ester bottoms mixture blended with stearic acid had the following material properties as shown in Table 2D below.

TABLE 2D

Material properties of hydrogenated metathesized palm oil ester bottoms blended with stearic acid.

|  | Typical Montan Wax | 75% C18 | 50% C18 | 25% C18 |
|---|---|---|---|---|
| Drop Point °F. (°C.) | 180 (82) | 160 (71) | 177 (80) | 194 (90) |
| Viscosity cP (°C.) | 15-30 (100) | 6 (100) | 9 (100) | 12 (100) |
| Needle penetration (dmm) | 1 | 4.9 | 2.9 | 16.6 |
| Carbon # | C24-34 | C16-24 24 <5% C10-15 | C16-24 24 <5% C10-15 | C16-24 <5% C10-15 |

Example 4

Metathesis Reaction

Refined-Bleached-Deodorized (RBD) soybean oil (about 780 kg) was charged to an agitated 2600 L vessel. The vessel and soybean oil were then sparged with argon gas overnight. The soybean oil was then heated to a temperature of 70° C. and 39 grams (50 ppm) of C827 ruthenium metathesis catalyst [i.e., 1,3-bis-(2,4,6-trimethylphenyl)-2-imidazolidinylidene dichlororuthenium (3-methyl-2-butenylidene)tricyclohexylphosphine] was added to the soybean oil to initiate the metathesis reaction. The agitated vessel was operated with a slight head pressure (about 2 psig or 0.14 atm) of argon gas. The metathesis reaction was allowed to proceed for two hours. Following this, the metathesized soybean oil was held in the vessel for an additional 4-5 hours. Following this, the metathesized soybean oil was transferred to an agitated holding tank in preparation for hydrogenation. The metathesized soybean oil was then split into four approximately equal batches for hydrogenation in order to accommodate the 300 L agitated, pressure-rated vessel that was available. A loading of 0.4 wt % nickel hydrogenation catalyst (Pricat 9925, from Johnson Matthey) was used for all batches. The reaction conditions for the four hydrogenation batches are summarized in Table 3.

TABLE 3

| Batch | Batch Size (kg) | Temperature (°C.) | H2 Pressure (psig) | Reaction Time (hr) |
|---|---|---|---|---|
| 1 | 194 | 210 | 50 | 4.0 |
| 2 | 193 | 175 | 90 | 4.0 |
| 3 | 193 | 185 | 90 | 2.3 |
| 4 | 180 | 185 | 90 | 2.7 |

The four hydrogenation products were combined in the 2600 L agitated tank in advance of filtration. The combined hydrogenated metathesized soybean oil was held at 70° C. Citric acid (0.1 wt %), bleaching clay (2.0 wt %), and filter aid (0.1 wt %) were mixed with the oil before passing through a plate and frame filter (10.2 cm by 5.1 cm frames). After filtration, 675 kg of hydrogenated metathesized soybean oil was recovered.

Example 5

Metathesis Reaction 18,300 pounds (8,300 kg) of RBD soybean oil (supplied by Cargill) was transferred from a tank into a nitrogen purged reaction vessel. Separately, 415 grams (50 ppm catalyst for the final reaction mixture) of C827 metathesis catalyst was slurried in about 4 gallons (15 L) of soybean oil. The resulting slurry was added to the soybean oil in the reaction vessel which was held at a temperature of 70° C. The reaction mixture was then held in the reaction vessel for a period of about 3 hours. GC analysis of samples of the reaction mixture showed that the reaction mixture reached equilibrium about 30 minutes after addition of the metathesis catalyst.

Next, 27.5 pounds (12.5 kg) of hydrogenation catalyst (PRICAT 9925 from Johnson Matthey) was charged to the vessel. Following addition of the catalyst, the head space in the vessel was charged with $H_2$ gas. During this time, the reaction mixture was heated to 120° C. When the temperature reached 120° C., the $H_2$ gas in the head space was increased to a pressure of 50 psig. The heat of the exothermic reaction was used to raise the temperature of the reaction mixture to 185° C. $H_2$ charging continued for an additional 3 hours. The final iodine value for the metathesized soybean oil was less than 1.

In the same reaction vessel a steady sparge of steam was introduced to remove the more volatile components by steam stripping. The vessel was cooled during stripping to 120° C. The resulting product was filtered at 120° C. by recirculating the product through a plate and frame filter (Sparkler, Conroe, Tex.) with a pre-coat of about 25 pounds (11.3 kg) of diatomaceous earth filter aid (CELATOM FW-14 from EaglePicher Filtration, Reno, Nev.). The final Ru content was less than 0.07 ppm Ru.

Example 6

Metathesis Reaction 15,900 pounds (7212 kg) of RBD soybean oil (Cargill) was loaded into a reaction vessel. The soybean oil was agitated and was sparged with $N_2$ gas for 2.5 hours at a rate of 50 SCFH (1.41 cubic meter/hr). Separately, 361 grams (50 ppm of catalyst in the final reaction mixture) of C827 metathesis catalyst was slurried in about 3 gallons (11.3 L) of soybean oil. The resulting slurry was added to the soybean oil in the reaction vessel. Following addition of the catalyst, the head space in the vessel was evacuated and purged with $N_2$ gas a total of 3 times over a period of 1 hour. During this time, the reaction mixture was heated to 71° C. The reaction mixture was then held in the reaction vessel for a period of about 3 hours during which the temperature rose to 76° C. GC analysis of samples of the reaction mixture showed that the reaction mixture reached equilibrium about 30 minutes after addition of the metathesis catalyst.

Next, 35.0 pounds (15.9 kg) of hydrogenation catalyst (PRICAT 9925 from Johnson Matthey) was charged to the vessel. Following addition of the catalyst, the head space in the vessel was evacuated and purged with $N_2$ gas a total of 3 times over a period of 1 hour. During this time, the reaction mixture was heated to 130° C. When the temperature reached 130° C., $H_2$ gas was charged to the vessel. Thirty minutes into hydrogenation, the reaction mixture reached a temperature of 180° C. and the flow of hydrogen was stopped for a period of about 75 minutes. After this, the $H_2$ charging resumed for an additional 3 hours during which the temperature ranged between 172° C. and 194° C. The resulting hydrogenated metathesized soybean oil was cooled to a temperature of 84° C. and excess $H_2$ was vented off. The oil was held at about 5 to 8 psig (0.34-0.54 atm) for about 9.5 hours before filtering.

The resulting product was filtered by recirculating the product through plate and frame filter (Sparker, Conroe, Tex.) with a pre-coat of about 25 pounds (11.3 kg) of diatomaceous earth filter aid ("CELATOM FW-14" from EaglePicher Filtration, Reno, Nev.). The product was recirculated through the filter for about 13 hours total. Twice during the filtration, the filter was taken apart for cleaning and was conditioned with about 25 pounds (11.3 kg) of filter aid. During filtration, the product was at a temperature of about 90° C. or less. The final Ru content was less than 0.1 ppm.

Example 7

Metathesis Reaction

RBD soybean oil (SBO) was used to prepare metathesized soybean oil. 1500 g of SBO was charged into a 2000 ml Parr reactor. After sealing the Parr reactor, the solution in the reactor was degassed with pressurized $N_2$ (50-100 psi or 3.4-6.8 atm) by pressurizing and releasing $N_2$ gas for 5 cycles. After degassing, 80 mg of C827 metathesis catalyst dissolved in 2 ml $CH_2Cl_2$ was added to the Parr reactor and the resulting solution was degassed again using $N_2$ gas for 3 cycles. Next, the solution in the Parr reactor was heated to 70° C. while mixing at 300 rpm. When the temperature reached 70° C., the mixing rate was increased to 500 rpm and the self-metathesis reaction was allowed to proceed at 70° C. for 3 hours. Following this, the solution in the Parr reactor was allowed to cool to room temperature. The Ru content of the solution was measured using ICP.

Example 8

Hydrogenation Reaction

For each trial identified in Table 4, the following general procedure was followed: 200 g of metathesized SBO (prepared as described above) and the amount of nickel catalyst (PRICAT 9925 from Johnson Matthey) designated in Table 4 were charged to a 600 ml Parr reactor. After sealing the Parr reactor, the resulting composition was heated to 80° C. and was degassed with pressurized $N_2$ (50-100 psi or 3.4-6.8 atm, for the control experiment without using $H_2$ in the hydrogenation reaction) or pressurized $H_2$ (50-100 psi, or 3.4-6.8 atm) by pressuring and releasing the gas from the Parr reactor for 5 cycles. After degassing, the Parr reactor was pressurized to 100 psi (6.8 atm) with $H_2$ gas, except for the control experiment in which neither hydrogen nor another gases was used. Then, the composition in the Parr reactor was heated to the desired temperature (see Table 4) while be mixed at 300 rpm. When the desired temperature was reached, a sample of the composition was taken and the sample was filtered at reduced pressure. The filtered composition was analyzed for Ru and Ni levels using ICP. For each trial, this sample was designated as the time 0 (zero) sample. After taking the sample, the composition in the Parr reactor was mixed at 500 rpm while maintaining the desired temperature for 4 hours. Following this, a sample was taken and the sample was filtered at reduced pressure. The filtered sample was analyzed for Ru and Ni levels using ICP. For each trial, this sample was designated as the 4 hour sample.

The hydrogenation conditions and Ru and Ni levels are provided in Table 4. Two hydrogen pressures (0 and 100 psi), three reaction temperatures (100, 190 and 250° C.) and two levels of the Ni catalyst (0.1 and 0.5%) were investigated in the hydrogenation experiments. The results are presented in Table 4.

TABLE 4

| Exp | Metathesized SBO | | | Hydrogenation Conditions | | | Reaction | HMSBO | |
|---|---|---|---|---|---|---|---|---|---|
| | Time (hr) | Ru* (ppm) | Ni* (ppm) | $H_2$ (psi) | Temp (° C.) | Ni Cat (%) | Time (hr) | Ru (ppm) | Ni (ppm) |
| A0 | 0 | 6.8 | 1.8 | 0 | 190 | 0.5 | 0.0 | 6.2 | 10.0 |
| A4 | 4 | 6.8 | 1.8 | 0 | 190 | 0.5 | 4.0 | 5.9 | 13.5 |
| B0 | 0 | 6.8 | 1.8 | 100 | 190 | 0.5 | 0.0 | 5.2 | 16.3 |
| B4 | 4 | 6.8 | 1.8 | 100 | 190 | 0.5 | 4.0 | 0.3 | 2.8 |
| C0 | 0 | 6.8 | 1.8 | 100 | 190 | 0.1 | 0.0 | 6.6 | 7.6 |
| C4 | 4 | 6.8 | 1.8 | 100 | 190 | 0.1 | 4.0 | 0.6 | 3.3 |
| D0 | 0 | 6.8 | 1.8 | 100 | 250 | 0.5 | 0.0 | 0.4 | 4.6 |
| D4 | 4 | 6.8 | 1.8 | 100 | 250 | 0.5 | 4.0 | 0.2 | 16.0** |
| E0 | 0 | 6.8 | 1.8 | 100 | 100 | 0.5 | 0.0 | 6.4 | 4.4 |
| E4 | 4 | 6.8 | 1.8 | 100 | 100 | 0.5 | 4.0 | 6.7 | 5.9 |

*The Ru content in the metathesized SBO is 6.8 ppm and the Ni content (1.8 ppm) comes from the contamination of the previous hydrogenation experiments that were conducted in the same Parr reactor.
**The high Ni content (16.0 ppm) in the product solution at 250° C. may be due to a higher solubility of Ni in the product solution.

The data shows that the hydrogen pressure, reaction temperature, and the amount of Ni catalyst are factors that contribute to Ru metal absorption and removal from the hydrogenated metathesized soybean oil (HMSBO) using the method of the invention. As shown in trials A0 and A4, the process is not effective without hydrogen gas being present. When other conditions were held constant, a higher hydrogenation temperature resulted in a decrease in Ru metal in the HMSBO. For example, 6.7 ppm Ru was obtained at 100° C. (E4); 0.3 ppm was obtained at 190° C. (B4); and 0.2 ppm Ru was obtained at 250° C. (D4). When other conditions were held constant, an increase in the amount of Ni hydrogenation catalyst from 0.1% to 0.5% resulted in a decrease in the Ru content in the HMSBO from 0.6 ppm to 0.3 ppm (see, C4 and B4). The reaction time also influences the Ru removal. The Ru content remained at almost the same as the initial level at the time zero for all the experiments (Exp AC, BC, CO and EU) except for the trial (Exp DC) at 250° C.

Example 9

Esters Synthesized from HMSBO 995 grams stripped acid wax derived from hydrogenated metathesized soybean oil (HMSBO) were melted and filled into a reactor. Next, 116.7 grams of ethylene glycol (approximately a 1:1 ratio of carboxyl group equivalents in the acid wax to hydroxyl equivalents in the alcohol) were added at room temperature. The mixture was molten at 80° C. under nitrogen and 5.0 grams of methanesulfonic acid catalyst (70% solution in water) were added (approximately 0.5 wt % catalyst per acid wax). The mixture was stirred and heated to 120-160° C. under nitrogen and held at 120-160° C. for several hours. Water, which is generated during the reaction as byproduct was distilled off. After the reaction, the mixture was vacuum pumped for 30-60 minutes to drive off residual water, and unreacted ethylene glycol. The wax was decanted out of the flask and tested for physical properties such as drop point, acid value, and needle penetration (dp 70.2° C., AV 31.2 mg KOH/g wax, np 1.8 dmm).

| Ethylene glycol | ratio [COOH:OH] | Drop point [° C.] | AV [mg KOH/g wax] | np [dmm] |
|---|---|---|---|---|
| Ester 1 | 1:1 | 70.2 | 31.2 | 1.8 |
| Ester 2 | 1:1 | 73.7 | 13.2 | 8 |
| Ester 3 | 1:1 | 74.6 | 7.7 | 4 |
| Ester 4* | 2:1 | 63.1 | 8.2 | 6 |
| Ester 5** | 1:1 | 78.4 | 10.7 | 4 |

*SAP = 204.2 mg KOH/g wax;
**SAP = 199.7 mg KOH/g wax.

Example 10

470 grams stripped acid wax derived from hydrogenated metathesized soybean oil (HMSBO) were melted and filled into a reactor. Next, 61.8 grams of pentaerythritol (approximately a 1:1 ratio of carboxyl group equivalents in the acid wax to hydroxyl equivalents in the alcohol) were added at room temperature. Additionally 80 mL toluene was added to prevent sublimation of the alcohol. The mixture was heated to 100° C. under nitrogen until all starting materials are molten/in solution and 2.4 grams of methanesulfonic acid catalyst (70% solution in water) were added (approximately 0.5 wt % catalyst per acid wax). The mixture was stirred and heated to 120-160° C. under nitrogen and held at 120-160° C. for several hours. Water, which is generated during the reaction as byproduct was distilled off as well as the toluene. After the reaction, the mixture was vacuum pumped for 30-60 minutes to drive off residual water, and toluene. The wax was removed from the flask and tested for physical properties such as drop point, acid value, and needle penetration (dp NA, AV 27.5 mg KOH/g wax, np<1 dmm).

| Pentaerythritol | ratio [COOH:OH] | Drop point [° C.] | AV [mg KOH/g wax] | np [dmm] |
|---|---|---|---|---|
| Ester 1 | 1:1 | NA | 27.5 | <1 |
| Ester 2* | 1:1 | 67.4 | 128.5 | 55 |

*SAP = 158.8 mg KOH/g wax.

Example 11

70 grams stripped acid wax derived from hydrogenated metathesized soybean oil (HMSBO) were melted and filled into a 250 mL flask. Next, 56.4 grams of stearyl alcohol (i.e., a 1:1 ratio of carboxyl group equivalents in the acid wax to hydroxyl equivalents in the alcohol) were added at room temperature. The mixture was molten at 80° C. under nitrogen and 0.35 grams of p-toluenesulfonic acid catalyst were added (i.e., 0.5 wt % catalyst per acid wax). The mixture was stirred and heated to 120-160° C. under nitrogen and held at 120-160° C. for several hours. Water, which is generated during the reaction as byproduct was distilled off to push the reaction to completion. After the reaction, the mixture was vacuum pumped for 30-60 minutes to drive off residual water. Finally, the wax was decanted out of the flask and tested for physical properties such as drop point, acid value, saponification value, and needle penetration (dp 61.7° C., congeal point ("cp") 59.5° C., AV 40.2 mg KOH/g wax, SAP 106.8 mg KOH/g wax, np 6 dmm).

| Stearyl alcohol | ratio [COOH:OH] | Drop point [° C.] | AV [mg KOH/g wax] | SAP [mg KOH/g wax] | np [dmm] |
|---|---|---|---|---|---|
| Ester 1 | 1:1 | 61.7 | 40.2 | 106.8 | 6 |
| Ester 2 | 1:1 | 64.2 | 10.2 | — | — |
| Ester 3 | 1:1.05 | 60.9 | 32.3 | 131.2 | 10 |
| Ester 4 | 1.05:1 | 65.1 | 21.8 | 108.7 | 7 |
| Ester 5 | 1:1.1 | 62.0 | 30 | 90 | 6 |
| Ester 6 | 1.1:1 | 61.2 | 41 | 107.1 | 7 |

Example 12

70 grams stripped acid wax derived from hydrogenated metathesized soybean oil (HMSBO) were melted and filled into a reactor. Next, 18.2 grams of 1,10-decanediol (i.e., a 1:1 ratio of carboxyl group equivalents in the acid wax to hydroxyl equivalents in the alcohol) were added at room temperature. The mixture was molten at 80° C. under nitrogen and 0.35 grams of p-toluenesulfonic acid catalyst were added (i.e., 0.5 wt % catalyst per acid wax). The mixture was stirred and heated to 120-160° C. under nitrogen and held at 120-160° C. for several hours. Water, which is generated during the reaction as byproduct was distilled off. After the reaction, the mixture was vacuum pumped for 30-60 minutes to drive off residual water. Finally, the wax was decanted out of the flask and tested for physical properties such as drop point, acid value, saponification value, and needle penetration (dp 64.4° C., cp 63.0° C., AV 19.0 mg KOH/g wax, SAP 188.9 mg KOH/g wax, np 7 dmm).

| 1,10-Decanediol | ratio [COOH:OH] | Drop point [° C.] | AV [mg KOH/g wax] | SAP [mg KOH/g wax] | np [dmm] |
|---|---|---|---|---|---|
| Ester 1 | 1:1 | 62.9 | 2.7 | 158.7 | 6 |
| Ester 2 | 2:1 | 64.4 | 19.0 | 188.9 | 7 |

Example 13

70 grams stripped acid wax derived from hydrogenated metathesized soybean oil (HMSBO) were melted and filled into a reactor. Next, 24.7 grams of 1,6-hexanediol (~a 2:1 ratio of carboxyl group equivalents in the acid wax to hydroxyl equivalents in the alcohol) were added at room temperature. The mixture was molten at 80° C. under nitrogen and 0.35 grams of p-toluenesulfonic acid catalyst were added (~0.5 wt % catalyst per acid wax). The mixture was stirred and heated to 120-160° C. under nitrogen and held at 120-160° C. for several hours. Water, which is generated during the reaction as byproduct was distilled off. After the reaction, the mixture was vacuum pumped for 30-60 minutes to drive off residual water. Finally, the wax was decanted out of the flask and tested for physical properties such as drop point, acid value, saponification value, and needle penetration (dp 68.7° C., cp 63.3° C., AV 2.7 mg KOH/g wax, SAP 170.0 mg KOH/g wax, np 23 dmm).

| 1,6-Hexanediol | ratio [COOH:OH] | Drop point [° C.] | AV [mg KOH/g wax] | SAP [mg KOH/g wax] | np [dmm] |
|---|---|---|---|---|---|
| Ester 1 | 1:1 | 68.7 | 2.7 | 170.0 | 23 |
| Ester 2 | 2:1 | 70.3 | 8.8 | 171.6 | 4 |

Example 14

70 grams stripped acid wax derived from hydrogenated metathesized soybean oil (HMSBO) were melted and filled into a reactor. Next, 15.9 grams of propylene glycol (i.e., a 1:1 ratio of carboxyl group equivalents in the acid wax to hydroxyl equivalents in the alcohol) were added at room temperature. The mixture was molten at 80° C. under nitrogen and 0.35 grams of p-toluenesulfonic acid catalyst were added (i.e., 0.5 wt % catalyst per acid wax). The mixture was stirred and heated to 120-160° C. under nitrogen using a condenser and held at 120-160° C. for several hours. Water, which is generated during the reaction as byproduct was distilled off. After the reaction, the mixture was vacuum pumped for 30-60 minutes to drive off residual water, and unreacted propylene glycol. Finally, the wax was decanted out of the flask and tested for physical properties such as drop point, acid value, saponification value, and needle penetration (dp 57.8° C., cp 59.0° C., AV 31.7 mg KOH/g wax, SAP 231.2 mg KOH/g wax, np 9 dmm).

| Propylene glycol | ratio [COOH:OH] | Drop point [° C.] | AV [mg KOH/g wax] | SAP [mg KOH/g wax] | np [dmm] |
|---|---|---|---|---|---|
| Ester 1 | 1:1 | 77.3 | 18.1 | 217.8 | 9 |
| Ester 2 | 2:1 | 57.8 | 31.7 | 231.2 | 9 |

Example 15

70 grams stripped acid wax derived from hydrogenated metathesized soybean oil (HMSBO) were melted and filled into a reactor. Next, 45.8 grams of dodecanol (i.e., a 1:1 ratio of carboxyl group equivalents in the acid wax to hydroxyl equivalents in the alcohol) were added at room temperature. The mixture was molten at 90° C. under nitrogen and 0.35 grams of p-toluenesulfonic acid catalyst were added (i.e., 0.5 wt % catalyst per acid wax). The mixture was stirred and heated to 120-160° C. under nitrogen and held at 120-160° C. for several hours. Water, which is generated during the reaction as byproduct was distilled off. After the reaction, the mixture was vacuum pumped for 30-60 minutes to drive off residual water. Finally, the wax was decanted out of the flask and tested for physical properties such as drop point, acid value, saponification value, and needle penetration (dp 54.7° C., cp 58.1° C., AV 4.8 mg KOH/g wax, SAP 172.4 mg KOH/g wax, np 25 dmm).

| Dodecanol | ratio [COOH:OH] | Drop point [° C.] | AV [mg KOH/g wax] | SAP [mg KOH/g wax] | np [dmm] |
|---|---|---|---|---|---|
| Ester 1 | 1:1 | 54.7 | 4.8 | 172.4 | 25 |
| Ester 2 | 2:1 | 60.7 | 104.4 | 204.5 | 20 |

Example 16

70 grams stripped acid wax derived from hydrogenated metathesized soybean oil (HMSBO) were melted and filled into a reactor. Next, 80.3 grams of docosanol (i.e., a 1:1 ratio of carboxyl group equivalents in the acid wax to hydroxyl equivalents in the alcohol) were added at room temperature. The mixture was molten at 90° C. under nitrogen and 0.35 grams of p-toluenesulfonic acid catalyst were added (i.e., 0.5 wt % catalyst per acid wax). The mixture was stirred and heated to 120-160° C. under nitrogen and held at 120-160° C. for several hours. Water, which is generated during the reaction as byproduct was distilled off. After the reaction, the mixture was vacuum pumped for 30-60 minutes to drive off residual water. Finally, the wax was decanted out of the flask and tested for physical properties such as drop point, acid value, saponification value, and needle penetration (dp 68.6° C., cp 67.8° C., AV 4.3 mg KOH/g wax, SAP 123.2 mg KOH/g wax, np 3 dmm).

| Docosanol | ratio [COOH:OH] | Drop point [° C.] | AV [mg KOH/g wax] | SAP [mg KOH/g wax] | np [dmm] |
|---|---|---|---|---|---|
| Ester 1 | 1:1 | 68.6 | 4.3 | 123.2 | 3 |
| Ester 2 | 2:1 | 68.3 | 79.9 | 163.2 | 4 |

Examples 17-22

Exemplary Products

Aqueous sodium hydroxide was added to 655.7 grams of hydrogenated, metathesized soybean oil (HMSBO), converting the HMSBO to soap. Thereafter hydrochloric acid was used to neutralize the soap and recover the HMSBO fatty acid mixture. The fatty acids solidify at the surface and remaining water was removed by heating the fatty acids to a temperature above about 100° C. in an open container. The mixture was then vacuum-distilled at five different temperatures between 190° C. and 230° C.

Resulting wax performance was tested using formulations listed in each example below (to be referred to as "Acid Wax" in the examples below). A similar formulation was also produced by substituting commercial montan acid wax (Clariant Licowax LP and referred to as "Montan Acid") and performance compared to the formula using the Acid Wax. A visual comparative scale was used to judge performance by rating from 1 to 5 (with 5 being the highest rating.) The acid wax was made by the following procedures:

Example 17

Atmospheric, Low Shear Wax Emulsion

Formula:

| Ingredient | Percent by Weight |
|---|---|
| Acid Wax | 10.0 |
| Morpholine | 1.1 |
| Water | 88.9 |

Procedure:

The emulsion was made by heating the water to 93.3-98.9° C. (200-210° F.). The wax is then heated to 98.9° C.-104.4° C. (210-220° F.). The morpholine was added to the water and mixed for one minute. The wax was added slowly to the water with low shear mixing. The resulting mixture was quickly cooled to 32.2° C. (90° F.) and poured into containers and stored for 24 hours at ambient temperature prior to testing.

Results:

| Test | Acid Wax | Montan Acid |
|---|---|---|
| Emulsion Stability | 4 | 4 |
| Buffed Film Gloss | 4 | 5 |
| Water Resistance | 4 | 4 |
| Detergent Resistance | 5 | 4 |
| Tape Adhesion | 3 | 3 |

Example 18

Solvent Dispersion Release Agent

Formula:

| Ingredient | Percent by Weight |
|---|---|
| Acid Wax | 20.0 |
| White mineral Spirit | 80.0 |

Procedure:

Ingredients were heated to 85° C. (185° F.) and then slowly cooled with low shear mixing until temperature reaches 32.2° C. (90° F.). The mixture was poured into containers and stored at ambient temperature for 24 hours, prior to testing.

Test Results:

| Test | Acid Wax | Montan Acid |
|---|---|---|
| Dispersion Stability | 5 | 4 |
| Film adhesion | 4 | 4 |
| Tape adhesion | 4 | 4 |

Example 19

Solvent Paste

Formula:

| Ingredient | Percent by Weight |
|---|---|
| Acid Wax | 30.0 |
| White mineral Spirit | 70.0 |

Procedure:

Ingredients were heated to 85° C. (185° F.) and mixed until homogeneous. The mixing was halted and the mixture was poured into containers and allowed to cool to ambient temperature, and stored for 24 hours, prior to testing.

Test Results:

| Test | Acid Wax | Montan Acid |
|---|---|---|
| Past hardness | 5 | 4 |
| Dried film quality | 4 | 4 |
| Buffed film | 4 | 5 |
| Tape adhesion | 4 | 4 |

Example 20

Liquid Solvent Auto Polish

Formula:

| Ingredient | Percent by Weight |
|---|---|
| Acid Wax | 10 |
| Carnauba Wax | 5 |
| Polyethylene Wax | 6 |
| Silicone 350 | 6 |
| Silicone 12500 | 3 |
| Mineral Spirits | 70 |

Procedure:

Ingredients were heated to 85° C. (185° F.) and then slowly cooled with low shear mixing until temperature reached 32.2° C. (90° F.) and stored at ambient temperature for 24 hours, prior to testing.

Test Results:

| Test | Acid Wax | Montan Acid |
|---|---|---|
| Stability | 4 | 4 |
| Buffed Film Gloss | 5 | 5 |
| Water Resistance | 5 | 5 |
| Detergent Resistance | 5 | 5 |

Example 21

Water-Based Cream Shoe/Leather Polish

Formula:

| Ingredient | Percent by Weight |
|---|---|
| Acid Wax | 10.0 |
| Paraffin Wax (138° F.) | 10.0 |
| Oleth-20 | 2.0 |
| Potassium Hydroxide (85%) | 0.5 |
| Water | 77.5 |

Procedure:

The emulsion was made by heating the water to 93.3-98.9° C. (200-210° F.). The acid wax, paraffin wax, and oleth-20 are heated to 98.9° C.-104.4° C. (210-220° F.). The potassium hydroxide was added to the wax mixture and mixed for five minutes. The wax mixture was added slowly to the water with high shear mixing until homogeneous. The resulting mixture was quickly cooled to 32.2° C. (90° F.) and poured into containers and stored for 24 hours at ambient temperature prior to testing.

Test Results:

| Test | Acid Wax | Montan Acid |
|---|---|---|
| Stability | 4 | 4 |
| Buffed Film Gloss | 4 | 4 |
| Water Resistance | 5 | 5 |

What is claimed is:

1. A method of producing a natural oil based fatty acid wax composition comprising:
   providing a natural oil;
   self-metathesizing the natural oil to obtain a metathesized natural oil;
   following the self-metathesizing, hydrogenating the metathesized natural oil to obtain a hydrogenated metathesized natural oil; and
   reacting the hydrogenated metathesized natural oil with water or a base to obtain a fatty acid wax, which comprises a free fatty acids or salts of fatty acids, (b) glycerol or alcohol, and (c) paraffin,
   wherein compounds having at least 18 carbon atoms make up at least 50 wt% of the fatty acid wax.

2. The method of claim 1, further comprising distilling the fatty acid wax under conditions sufficient to remove at least 80 wt % of the light fraction of the fatty acid wax.

3. The method of claim 1, further comprising removing the glycerol or alcohol from the fatty acid wax.

4. The method of claim 1, wherein the reacting comprises saponifying the hydrogenated metathesized natural oil.

5. The method of claim 4, wherein the saponifying comprises using a phase transfer catalyst.

6. The method of claim 1, wherein the reacting comprises reacting the hydrogenated metathesized natural oil with water.

7. The method of claim 6, wherein the reacting is carried out by a mechanism selected from the group consisting of the Twitchell process, enzymatic fat-splitting, batch autoclave fat-splitting, and continuous process fat-splitting.

8. The method of claim 1, wherein the fatty acid wax comprises 85-100 wt % long-chain fatty acids and 0-15 wt % esters, wherein the fatty acid comprises 15-60 wt % long chain di-acids and 40-85 wt % long chain mono-acids.

9. The method of claim 1, wherein the fatty acid wax has a needle penetration of 30 dmm or less.

* * * * *